United States Patent [19]

Roth

[11] Patent Number: 4,497,024
[45] Date of Patent: Jan. 29, 1985

[54] NUCLEAR IMAGE DISPLAY CONTROLLER

[75] Inventor: David A. Roth, Dousman, Wis.

[73] Assignee: General Electric Company, Schenectady, N.Y.

[21] Appl. No.: 280,713

[22] Filed: Jul. 1, 1981

[51] Int. Cl.³ .............................................. G06F 15/42
[52] U.S. Cl. .................................... 364/414; 128/659; 250/363 S; 340/706; 340/723; 340/798; 358/11; 378/901; 382/6
[58] Field of Search ................. 364/414, 200; 358/111, 358/280; 378/901; 340/703, 705, 723, 793, 799, 800; 382/6; 128/653, 659; 250/363 S

[56] References Cited

U.S. PATENT DOCUMENTS

| Re. 31,200 | 4/1983 | Sukonick et al. | 340/793 X |
|---|---|---|---|
| 3,976,982 | 8/1976 | Eiselen | 340/705 X |
| 4,179,607 | 12/1979 | Lange et al. | 364/414 X |
| 4,197,583 | 4/1980 | Westell et al. | 364/414 X |
| 4,222,048 | 9/1980 | Johnson | 340/723 X |
| 4,223,353 | 9/1980 | Keller et al. | 340/793 X |
| 4,303,986 | 12/1981 | Lans | 340/800 X |
| 4,367,490 | 1/1983 | Riederer | 358/111 X |

OTHER PUBLICATIONS

Bacharach, Green, Borer, Douglas, Ostrow, Johnston, "A Real-Time System for Multi-Image Gated Cardiac Studies", Journal of Nuclear Medicine, vol. 18, No. 1, pp. 79-84, Jan. 1977.
Williams, Morgan, Davies, "A System for ECG Synchronized Gamma Camera Studies", Phys. Med. Biol., Sep. 1980, vol.25, No. 5, pp. 935-940.
Shibayama, Iwata, "Data Processing System With a Slave Computer", European Patent Application, publ. No. 0021365, Jan. 1981.

Primary Examiner—James D. Thomas
Assistant Examiner—David L. Clark
Attorney, Agent, or Firm—Fuller, House & Hohenfeldt

[57] ABSTRACT

In a nuclear imaging system the digitized x and y coordinates of gamma ray photon emission events address memory locations corresponding to the coordinates. The respective locations are incremented each time they are addressed so at the end of a selected time or event count period the locations contain digital values or raw data corresponding to the intensity of pixels comprising an image frame. The raw data for a frame is coupled to one input of an arithmetic logic unit (ALU) whose output is coupled to a display controller memory. The output of the controller memory is coupled to another ALU input with a feedback bus and is also coupled to a further signal processing circuit which includes means for converting processed data to analog video signals for television display. The ALU is selectively controlled to let raw image data pass through to the display controllor memory or alternately to add (or subtract) raw data for the last image frame developed to the raw data for preceding frames held in the display controller to thereby produce the visual effect on the television screen of an isotope flowing through anatomy.

4 Claims, 3 Drawing Figures

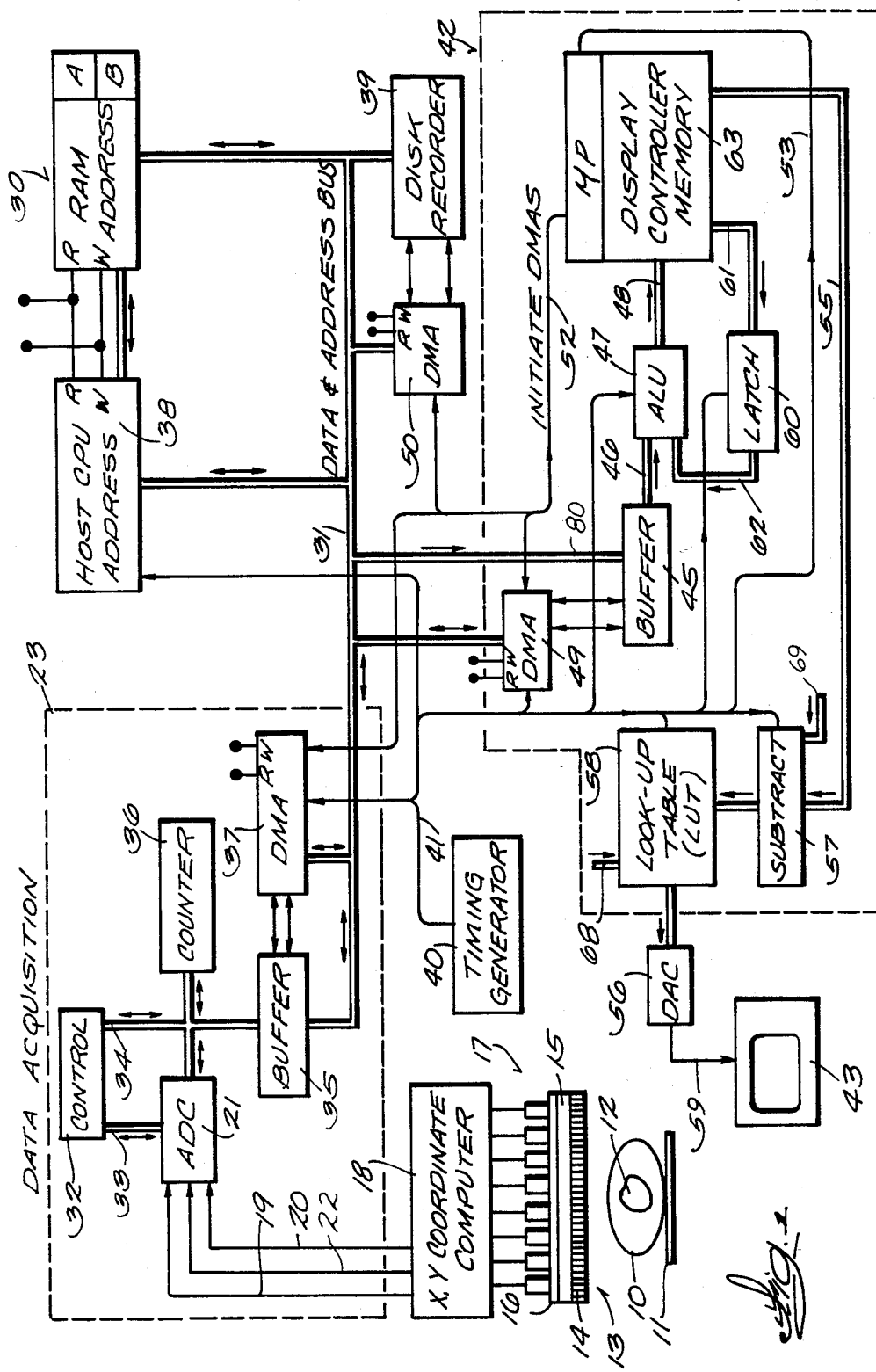

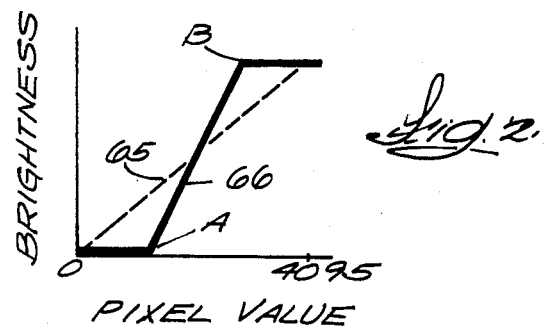
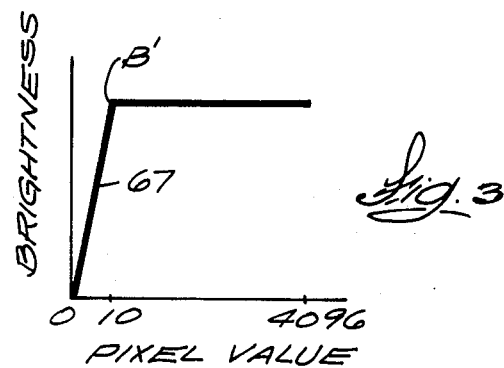

NUCLEAR IMAGE DISPLAY CONTROLLER

BACKGROUND OF THE INVENTION

This invention relates to an image display system for nuclear or gamma cameras such as are used in the practice of nuclear medicine.

One invention disclosed herein is for achieving high speed addition or subtraction of picture element (pixel) data before it is entered into a display controller memory. One purpose for which high speed image addition or subtraction is needed is to produce the visual effect, in the image display, of radioisotope-infused blood flowing into an anatomical region of interest such as the arteries or chambers of the heart. This requires subtraction or addition of image data at a very high speed to produce a flicker-free display on the screen of a television monitor.

The new high speed image addition and subtraction method and apparatus described herein is used in conjunction with a conventional nuclear camera, or scintillation camera as it is sometimes called, to sense the gamma ray photons emitted from a body in which a radioactive isotope has been administered. The camera used is similar to the well-known Anger camera described in U.S. Pat. No. 3,011,057.

One known method of adding or subtracting the digital pixel data for successive image frames involves taking the data representative of previous frames out of the display controller and then having the host central processor or computer used in the system normalize the data for the current image frame, add it to the data removed from the display controller and then restore it to the display controller for driving the TV display. Typically, a display controller memory will have 256×256 pixel locations. Thus, the host central processor in this prior art approach must do about 65,000 additions which typically require about 80 microseconds per addition before the data can be restored to the display controller. This results in a minimum of 5.2 seconds elapsing between presentation of successive image frames and is perceived on the display screen by the physician as a jerky and distorted image. This prior art method also has the disadvantage of loading the host central processor and the system data and address bus since the processor must perform the arithmetic operations at intervals between the other operations which it must perform. Gamma ray photon emission data coming in from the gamma camera for the present image frame may be lost in part as a result of the host computer being occupied with the arithmetic operations so it cannot properly handle incoming data during the arithmetic operation intervals.

A second prior art method accomplished frame additions at the expense of using less than the full resolution characteristics of the display controller and at the expense of performing this arithmetic operation at a non-real-time basis with the results being stored on a mass storage device such as magnetic disk. Display controllers used in nuclear camera systems can normally show a 32×32, 64×64, 128×128, or 256×256 pixel image over the full TV monitor display screen. Thus, in accordance with this prior art method, a portion of the full memory capacity is used for the image display so the remainder of the memory can be loaded with data, already added to or subtracted from the previous data by a host central processor. Since fewer pixels are added or subtracted, less time is required for the arithmetic operations and visual distortion on the display screen is reduced significantly in comparison with the prior art method first discussed above. In the second method, for example, a field of 128×128 pixels may be used in the display controller memory. After these pixels are loaded into the memory, a frame display switch occurs which then displays the field just loaded. Data for the reduced size field is then transferred from the display controller to the host computer for performing the pixel addition or subtraction operations after which the data is returned to the display controller for displaying the image. Even though fewer arithmetic operations are required in this prior art mode, as much as 1.3 seconds can elapse between presented images. Other disadvantages of this method are that the full resolution of the display controller cannot be used and the host computer is loaded heavily when performing frame additions or subtractions as in the previously discussed prior art method. Moreover, with either prior art method, true real-time image frame presentation cannot be achieved.

A further disadvantage of the prior art methods is that the raw image data for a preceding frame is lost when the data is removed from the display controller for making the additions or subtractions and normalizations to fill the full bit range of the display controller memory locations. For some signal processing modes it is desirable to have the raw data for the image frames available and displayed.

SUMMARY OF THE INVENTION

The present invention overcomes the disadvantages of the prior art methods discussed above. Objects of the invention are to provide a simple hardware implementation which produces high speed image frame additions or subtractions and a flicker-free display of the images without unduly loading the host computer and without loss of incoming emission data nor loss of raw picture element (pixel) data.

In the system in which the invention is used, a conventional nuclear scintillation camera such as an Anger type camera detects the gamma ray photons emitted by the radioisotope-infused body organ. The x and y coordinates of each photon reaction or scintillation event are computed and expressed in terms of analog voltage signals, respectively. The coordinates are converted to digital values which are treated as addresses to locations in a memory associated with a host computer. In what is called a frame mode of operation, each time a scintillation event occurs, the memory location addressed is incremented by 1 such that digital data are accumulated in respective memory locations corresponding to the number of events, and, hence, to the brightness or intensity of the pixels which form the image frame. After an interval, that is selected by the physician but timed automatically and depends on such factors as the type of radioisotope that is being used, the pixel data for the image frame is sent to the display controller after which it is further processed through the display controller hardware and converted to analog video signals for television display.

According to the invention, subtracting image data or, more frequently, adding image data for the frame currently being produced to data for preceding frames to provide the visual effect in the display of the isotope flowing into an anatomical region of interest is achieved as follows. An arithmetic logic unit (ALU) is interposed in the bus that transfers the raw image data from the host processor memory to the display controller memory. There is a feedback bus between the display controller memory and one input of the ALU. When operation in the successive frame subtraction or addition image modes is desired, the display controller is caused to feed back its pixel data contents for being added by the ALU in phase with the most recently accumulated and transferred image data so that successive added images are displayed without any perceptible time interval between them. The data from the display controller never needs to be brought back to the host computer for addition, subtraction, normalization or other processing.

An additional feature of the invention which will be described herein, but claimed in a co-pending application filed July 1, 1981, Ser. No. 280,714, abandoned, is that the raw data is always preserved in the display controller and is normalized and subject to level and window control between the output of the display controller memory and the television display monitor without involving the central processor.

In some cases where isotope photon emission intensity is relatively low or where exposure intervals are short, the digital numbers corresponding to the brightness of some pixels may be very low and the digital numbers for the brightest of the pixels in the same image frame may be far below the 12-bit or 0 to 4095 digital resolution range typically available in the display controller. In such cases it is common to let the lowest and highest pixel value levels define the upper and lower limits of the window. A window can also be defined as any range within the upper and lower pixel value limits that result from an exposure. In such cases it is desirable that an opportunity be provided for expanding the pixel range within the window to the full dynamic scale or range of the display controller so that the displayed image will extend over the full gray scale range of the television monitor. In accordance with the prior art, the host computer is used to adjust the pixel data to the full resolution range of the display controller. This means that the incoming data has to be normalized by the host computer before it is sent to the display controller. The result is that the raw data, being modified to fit the full resolution range of the display controller, is lost. Moreover, the host computer has to suspend performance of other operations while it is making the window and level calculations on a pixel-by-pixel basis. In accordance with said additional feature of the invention, means are provided for permitting display of an image over the full resolution range of the display controller and television monitor without involvement of the central processor. In other words, window and level control is provided for after the pixel data is output from the display controller. This is achieved by using a subtractor in combination with a look-up table in a part of the circuit before the digital data is converted to analog video signal form for television display as will be described in detail later.

How the foregoing and other more specific objects of the invention are achieved will be evident in the more detailed description of the invention which will now be set forth in reference to the drawings.

DESCRIPTION OF THE DRAWINGS

FIG. 1 is a block diagram of those components of a nuclear camera system which are necessary to explain the invention; and FIGS. 2 and 3 are graphs which are useful for explaining certain features of the invention.

DESCRIPTION OF A PREFERRED EMBODIMENT

In FIG. 1, a body 10 in which an isotope may have been infused is supported on a table top 11. An organ such as the heart whose chambers or arteries may be receiving the isotope-entraining blood is designated by the numeral 12. As is well known, the various isotopes used in nuclear medicine emit gamma ray photons in a pattern which permits visualizing the configuration of body tissue and blood vessels, for example. The nuclear or gamma camera used to detect and identify the coordinates of the gamma ray photon emissions is designated generally by the numeral 13 and is conventional. The camera comprises a lead plate 14 that has a myriad of fine holes so the plate acts as a collimator. Interfaced with the collimator is a scintillation crystal 15 which produces scintillations wherever photons are absorbed by it. The scintillations are coupled by means of a glass plate 16 to an array of photomultiplier tubes which are collectively designated by the numeral 17. The photomultiplier tubes are usually packed closely with each other within a circle as is well known. Any detected scintillation causes the photomultiplier tubes 17 to produce respective analog signals which are sent to a computer that is symbolized by the block marked 18. The computer uses the signals to compute the x and y coordinates of each scintillation event and it expresses the coordinates of each scintillation event in terms of analog signal magnitudes. Computing the x and y coordinates in terms of analog signals is well known. One scheme for determining the x and y coordinates of each scintillation is described in U.S. Pat. No. 4,142,102. The analog x and y coordinate signals are transmitted from the computer by way of lines 19 and 20 to an analog-to-digital converter (ADC) represented by the block marked 21. A third line 22 running from the computer carries a signal, commonly called a z signal, which is indicative of whether the magnitude of the scintillation pulse was high enough or of the correct isotope to be considered a valid pulse.

ADC 21 is part of a data acquisition module which is within the boundaries of the dashed line 23. The output of ADC 21 to a bus 34 is a series of digital number pairs which correspond to the x and y coordinates or the addresses of the scintillations. Each scintillation falls within the boundaries of one of the pixels which define the image frame. The digital coordinate values are used as addresses to locations in a random access memory (RAM) that is generally designated by the numeral 30 and appears in the upper right portion of FIG. 1.

In the frame mode of operation, every time a pixel location in the memory is addressed, the digital number representing the number of scintillation events at that pixel address is taken out of that location and incremented by one so that at the end of an exposure interval the number in the location is representative of the brightness or intensity of the pixel. The buses for transferring data and addresses are represented collectively by a single bus 31 on which the legend, data and address bus has been applied.

The data acquisition module 23 is involved in the memory location incrementing operation just described. It contains a control that is represented by the block marked 32. It is coupled to ADC 21 with a bidirectional control bus 33 and it also has a bus 34 which connects to the data and address bus 31 through a buffer 35. There is also an event counter 36 and a direct memory access (DMA) controller 37 in the acquisition module 23. The host central processor or computer for the system is represented by the block marked 38. The host central processor unit 38 will hereinafter be called the CPU for the sake of brevity.

As indicated above, every time a location in RAM 30 is to be incremented by 1, the present contents are withdrawn from the affected location and sent to the control 32 where the digital value is incremented and then returned back to the memory location. The host CPU 38 provides the signals for causing DMA 37 to make the data transfers at the proper time from ADC 21 to RAM 30 and from the RAM to data acquisition control unit 32 for incrementing. Buffer 35 is for the conventional purposes of interchanging data between buses or components in proper timing and for assuring that the data is stabilized before a transfer is made. Counter 36 in data acquisition module 23 is for counting the total number of scintillation events during a particular exposure or study. For instance, a particular study might be considered terminated after a certain number of scintillation event counts such as 100,000 counts have been made. The host CPU under software control and as a result of the user's choice will set the counter to begin counting and terminate counting when the desired number of counts are completed. Sometimes it is desired to image only a particular region of interest and the counter is set to bring about termination of the study when the total number of counts within the region are reached. In such cases, only those counts which are obtained from scintillation events at x,y coordinates or pixels falling within the region of interest are counted. In region of interest studies, however, the pixel locations in RAM 30 are incremented so all of the information obtainable from regions surrounding the region of interest will also be available from RAM if needed.

In the frame mode, besides returning the pixel data to RAM locations after they have been incremented, the pixel data is also sent to a disk recorder represented by the block marked 39 and the display controller which is represented by the dashed line block 42. Thus, all of the pixel intensity data for a frame are also available from disk recorder 39 at any time. To permit making a sequence of frames without requiring excessive memory capacity in RAM 30, the RAM memory is divided into sectors or blocks which are symbolized by those marked A and B in RAM 30. Thus, pixel data are acquired in a block of memory A for a predetermined time interval determined by CPU 38. After the end of that interval and before the block of memory is overloaded, the pixel data are transferred to disk recorder 39 and to the display controller 42 while at the same time the incoming data from the data acquisition module are switched to the other memory block B so there is no interruption in data acquisition. The acquisition data are repeatedly switched back and forth between blocks A and B in RAM 30 until the host CPU brings about termination of the study. Thus, from the description so far, one may see that the pixel data for a frame currently being acquired is in one of the memory blocks A or B and also available, as required from disk recorder 39 and presented for display from the display controller 42. The digital numbers acquired in RAM 30, disk recorder 39, and display controller 42 in the frame mode have a value corresponding to the brightness or intensity of the respective pixels.

A timing generator symbolized by the block marked 40 is provided for properly timing and synchronizing data and address transfer events in the system. Lines such as the one marked 41 leading out from the timing generator 40 are shown just to suggest that the timing function is present as those skilled in the art will appreciate.

A display controller which bears that legend and is symbolized by the block marked 42 is used in the system. The display controller, as is well known, has a memory for accepting the pixel or image frame data and bringing about display of the data as an image on a television monitor which is represented by the block marked 43. When operating in the frame mode, the digital pixel for a preceding frame will be present in the display controller for real-time display on the screen of television monitor 43. At this time data for the next image in a sequence will be acquired in one of the memory blocks A or B so the frame presentation on the television monitor is always one frame behind the frame that is currently being acquired. Thus, when the data for a frame has been acquired, it is transferred by way of bus 80 through a buffer 45. The buffer is coupled by way of a bus 46 to an arithmetic logic unit (ALU) which is represented by the block marked 47 and is one of the components which in accordance with the invention, permits adding and subtracting data for successive image frames without putting the data back on the main buses and without requiring the host central processor to perform the arithmetic operations. The output of ALU 47 is coupled, by means of a bus 48 to an input of display controller memory 63. ALU 47, besides having the capability for adding or subtracting digital pixel data before it enters the display controller, can also let the data from bus 46 flow through without operating on it as it goes to the display controller memory 63. A DMA 49 is used to control transfer of pixel data from RAM 30 through buffer 45 to ALU 47 at appropriate times. DMA 49 performs the traditional function of notifying the CPU 38 that the data bus 31 is required for making a transfer from RAM 30 to ALU 47 and display controller memory 63.

Another DMA 50 is associated with disk recorder 39 and its purpose is to transfer data in and out of disk recorder 39 at the proper times. DMA 50 can be used to control transfer of data from the RAM memory to the disk recorder 39 as mentioned above and it can also control transfer of data from disk recorder 39 to the RAM 30 when one desires to display a sequence of images that are stored on disk. DMA 50 is also used for controlling transfer of data to disk recorder 39 when the system is being operated in the list mode which will now be briefly discussed.

The list mode is used for making very high resolution images which is tantamount to saying that the exposure interval is long enough for a high number of scintillation events to be counted inside or outside of a region of interest. In the list mode, as opposed to the frame mode, the addresses representative of the x and y coordinates of scintillations derived from ADC 21 are recorded directly in RAM 30. Host CPU 38 controls the system so that for a certain time interval or a certain number of counts the addresses will go into memory block A of the RAM and then into block B. When a block is filled, DMA 50 causes the list of addresses to be transferred to disk recorder 39. When a study is complete and the total number of counts is recognized by CPU 38, DMA 50 causes the list of addresses to be fed back to RAM 30 for the CPU to convert them to digital values that correspond to the brightness, rather than the locations of the pixels. For example, the CPU looks at all of the addresses in sequence and adds the total number of counts in each address and returns the result to the disk recorder as pixel data for one or more frames. Basically the CPU performs the function of converting x,y coordinate data to the number of events at each coordinate so the data returned to the disk recorder corresponds in value to the brightness of each pixel in the reconstructed image.

From the description thus far it will be evident that when operating in either the frame mode or the list mode, the display controller will contain the raw image data for the image frame that precedes the frame currently being acquired in RAM 30. It is important to note that the data in the display controller memory 63 at any time are simply the raw pixel data which has only been acquired and has not been normalized or operated on in any manner by the host CPU.

Assume now that the pixel data for an image frame acquired under one mode or another is now in the memory 63 of the display controller 42. Typically the display controller memory has a 256×256 pixel array. The brightness or intensity of each pixel is represented by the value of a digital number in the respective display controller memory locations. The digital values must be converted to analog video signals for permitting display on television monitor 43. Typically the bit range of the display controller memory locations is 12-bits and that is true here by way of example and not limitation. The 12-bit digital values are transferred in sequence by way of a bus 55 to a digital-to-analog converter or DAC 56 where the digital data is converted to analog video signals which are sent by means of a cable 57 to television monitor 43 to effectuate display of the image. In accordance with said additional feature of the invention, the digital signals from the display controller are operated on by a subtractor and a look-up table (LUT) 58, respectively, as will be discussed more fully later.

As indicated earlier, a unique feature of the system thus far described is that it is endowed with a capability for adding images in succession to the image data in the display controller to produce a visual effect on the television monitor screen of an organ moving or of the isotope-entraining blood advancing through blood vessels or chambers of the heart. As pointed out earlier, prior art practice was to take the present frame data out of the display controller and have the CPU add the new image data to the old and normalize it to fill the full scale or resolution range of the display controller and then return it to the display controller for visualization on the screen of the television monitor 43. This prior art mode, as has been indicated, requires much time and negates visualization of a smoothly changing image on the screen. In other words, there must be a large lapse of time between presentation of the successive images. In accordance with one feature of the invention, the use of ALU 47 and a latch 60 solves this problem.

Latch 60 is in a feedback loop comprised of bus sections 61 and 62 which can feed the image data presently in the display controller memory 63 to one input of ALU 47. When the image addition mode is in effect, the incoming image data to the ALU by way of a bus 46 is added in-phase with the image data that is fed back from the display controller memory through the latch 60 and the added data is immediately fed back by way of bus 48 to the proper locations in the display controller memory. The digital data for the succession of images are thereby put into the display controller without any delay between them so that continuous rather than intermittent motion may be visualized on the screen of the television monitor. In an actual embodiment, where the full frame capacity of the display controller memory is used, that is, where a 256×256 pixel image in the display controller memory has a corresponding image added to it by means of ALU 47 only 0.25 seconds were required to make the addition. For lower resolution cases where, for example, a 128×128 pixel array is used, the new data can be added in ALU 47 and re-entered into the display controller memory 63 in one-fourth of the time, that is, in a maximum of 0.0625 seconds. For the lowest resolution case, where a pixel array of 32×32 locations is acceptable, the additions or subtractions can be performed in 0.04 seconds maximum time, for example. Latch 60 is required to assure that the data in the feedback loop is stable and in phase with the current image data fed to the other input of the ALU 47.

Now that the new image addition and subtraction apparatus which does not require the CPU to make the calculations has been described, it is appropriate to describe the additional feature of the invention which was mentioned above. This feature is distinguished by permitting normalization and window and level control on the output side of the display controller rather than having these functions performed by the CPU. In other words, this feature avoids loading the buses and disrupting the CPU when they are busy acquiring image data and it allows preservation of the raw pixel data in the display controller which is not possible according to the prior practice where the CPU normalizes the data before it is input to the display controller.

In accordance with the additional feature of the invention, the window-level operation is a real-time numeric operation on data coming out of the display controller memory 63 and going to the video DAC 56 for display. For the purpose of explanation, reference is made to the plots depicted in FIGS. 2 and 3. In FIG. 2 the x-axis may be looked upon as the digital pixel data values in the controller and the y-axis as the intensity output which in the prior art would be at the output of the controller 42 and in the present invention at the output of LUT 58. In accordance with the prior art, the practice is to map into the display controller memory 63 the full scale intensity that is possible to be displayed through host CPU normalization. In other words, in prior practice, the CPU is used to scale the incoming raw data so the brightest of the pixels in the display controller is represented by the maximum available digital value such as 4095 in a 12-bit depth memory and the darkest or black pixels are represented by 0. This prior practice is illustrated by the dashed line or straight linear ramp marked 65 in FIG. 2. If, in accordance with the prior art, it is desired to display only those pixel values lying within a window above a certain level so that parts of the image are not displayed, it is necessary to have the CPU perform the subtractions and additions of pixel data to establish the window limits and level and then normalize that data for mapping it into the full scale intensity of the display controller again. This takes a substantial amount of CPU computation time and interferes with its normal data acquisition duties. Moreover, once the data is normalized there is no way of getting it back to the original data. As is known, window and level selection is used for eliminating or emphasizing some feature in the image. For instance, parts of the bony spine or rib cage might be imaged along with anatomy which is of greater interest such as the chambers of the heart. For display purposes it is desirable to have the capability of subtracting out that which is not of interest so that that which is of interest is more easily visualized. Use of subtractor 57 and LUT 58 as in FIG. 1 in accordance with the additional feature of invention, provide a solution to the problem of avoiding host CPU involvement in window-level selection. Referring to FIG. 2, in accordance with the invention, a real-time subtraction is performed in subtractor 57 on the digital pixel data after it is output from the display controller memory 63. Thus, for example, up to a certain point along the x axis in FIG. 2 a point A is established at which all pixel values below those at point A are subtracted out and A becomes 0. The range from A up to a maximum intensity at point B is the window and any pixel value greater than that at point B is displayed at maximum intensity. As illustrated further in FIG. 3, if, by way of example, a count of pixel value is small such as 10 as raw data in the display controller the value 10 is displayed at maximum brightness as at B' and the pixel value range extends down to 0. Thus, in accordance with the invention, a small raw data count corresponding to a pixel can be displayed as full scale on the TV monitor just as if a count in the display controller location were at full range or at a digital value of 4095.

Considering the electronics now, the raw data from the display controller are fed to the subtractor 57. The subtractor has an input 69 for being loaded with a 12-bit number which controls what the subtraction value should be. For instance, the 12-bit number determines what the A position in FIG. 2 should be where the original raw pixel value is made to correspond to 0 as black or some less than full brightness level or as the bottom of the window. The 12-bit number is supplied by the host CPU under software control when the user selects a particular window level. In other words, in the subtractor, all values between 0 and the particular A chosen are subtracted out. The result goes into LUT 58 which is operative to define the slope 66 in FIG. 2 or 67 in FIG. 3. The slope corresponds to the brightness level changes from the darkest to the brightness at point B or B'. LUT 58 has an input 68 for being loaded with slope data under control of the host CPU from the data and address bus 31. The LUT is essentially a programmable RAM acting as a read-only memory. When the subtracted value such as 0 is fed from subtractor 57 to the LUT input, a digital value of 0 is fed to the DAC 56 from the LUT. For every pixel value remaining above 0 that is input to the LUT it outputs a pixel having a value corresponding to the brightness level intercept on a slope such as 66 or 67.

Although the new image addition method and apparatus and the new window-level determining method and apparatus has been described in detail, such description is intended to be illustrative rather than limiting, for the inventions may be variously embodied and are to be limited only by interpreting the claims which follow.

I claim:
1. Apparatus for imaging anatomy that has been infused with a radiation photon emitting radioisotope, comprising:
    camera means including a planar scintillation crystal for being arranged over the anatomy to produce scintillations in response to absorption of photons emitted from said anatomy to the crystal during predetermined intervals,
    an array of detectors arranged on a side of said crystal opposite of the side on which the photons enter, said detectors producing electric signals corresponding to the scintillations,
    computer means having input and output means, the input means coupled to said detectors for receiving said signals, said computer means using said signals to generate analog signals corresponding in amplitude to the x and y coordinates of each scintillation,
    an analog-to-digital converter (ADC) having input and output means, the input means coupled to the output means of the computer means for receiving said analog coordinate signals, said ADC converting said analog signals to digital values representative of the x and y coordinates of the scintillations,
    addressable digital memory means having a plurality of storage locations, said digital x and y coordinate values corresponding to each detected scintillation constituting an address to a storage location, said locations corresponding, respectively, to picture elements (pixels) that compose an image frame, said locations storing digital numbers representative of the intensities of the pixels,
    a central processor unit (CPU), control means including means for incrementing digital numbers and bus means interconnecting said CPU, digital memory means, address output means of said ADC and said control means,
    each time a location in said digital memory means is addressed said CPU uses said address to effect transfer of the digital pixel intensity number stored in said location to said control means for being incremented by one and returned to the same location in said memory means,
    a display controller including a digital memory, said memory having input and output means,
    an arithmetic logic unit (ALU) having a plurality of input means and having output means, the output means being coupled to the input means of the display controller memory,
    buffer means having input means coupled to said bus means and having output means coupled to an input means of said ALU,
    latch means having input and output means, the input means connected to said output means of said display controller memory and the output means connected to an input means of said ALU,
    a first direct memory access (DMA) controller operative to periodically cause transfer of the digital pixel intensity representative numbers for an image frame from the first mentioned memory through said buffer means to one input of said ALU while corresponding pixel intensity representative numbers for frames previously transferred to said ALU are being fed back from said output means of the display controller memory through said latch to the other input of said ALU to thereby add or subtract the pixel values for successive images when said ALU is set to add or subtract, respectively,
    a digital number subtractor having input and output means, the input means being connected to an output means of said display controller memory, said subtractor subtracting the same digital number from the digital pixel intensity representative numbers supplied from said display controller memory to thereby reduce the level of all of said numbers proportionately, a look-up table (LUT) comprised of a random access memory (RAM) having locations corresponding to the locations of the pixels, said RAM having output means and having address input means connected to the output means of said subtractor, said LUT having been previously loaded with a translation table for determining the slope of the brightness versus pixel number relationship for the numbers resulting from the subtraction, said numbers constituting addresses to said LUT locations, addressing any location resulting in a digital signal representative of pixel brightness appearing at the output means of said RAM, a digital-to-analog converter coupled to the output means of said RAM for converting said signals to analog video signals, and television means for displaying an image represented by said video signals.

2. The apparatus according to claim 1 including:

disk recorder means coupled to said bus means, a second direct memory access (DMA) controller for transferring the digital numbers representative of the pixels composing the image frames to said disk recorder by way of said bus from said addressable digital memory after each frame is completed and for transferring the digital numbers composing a frame from said disk recorder in sequence to said ALU so that the frame being transferred is selectively added or subtracted in the ALU to the frame which is presently in the display controller.

3. A method of imaging anatomy that has been infused with a radioisotope comprising the steps of:

detecting events corresponding to radiation emissions from said radioisotope during predetermined intervals corresponding to image frames, producing digital numbers corresponding to the x and y coordinates of each event, said numbers representing addresses to locations in a digital memory, for storing digital values corresponding to the intensities of picture elements (pixels) composing an image frame, incrementing the values in said locations, respectively, each time the locations are addressed such that the locations contain digital data at the end of said predetermined interval corresponding to the intensities of the pixels for an image frame, using a direct memory access (DMA) controller to transfer the data for a frame presently in said memory to an input of an arithmetic logic unit (ALU) having an output coupled to the input of a display controller memory which contains the data for a preceding frame and which has an output coupled to another input to the ALU, controlling the ALU to do one of passing the data for the present frame directly to the display controller memory for adding or subtracting the data for the present frame respectively to or from the data for a previous frame in the controller memory, and further processing the digital data output from the display controller memory including converting said data to analog video signals for controlling a television monitor to display the image.

4. A method of imaging anatomy that has been infused with a radioisotope comprising the steps of:

detecting events corresponding to radiation emissions from said radioisotope during predetermined intervals corresponding to image frames, producing digital numbers corresponding to the x and y coordinates of the respective events, said numbers representing addresses to locations in digital memory for storing digital values corresponding to the intensities of picture elements composing an image frame, recording said addresses for a frame consecutively in a disk recorder, feeding said addresses to a central processor when a frame is complete for said processor to calculate the number of events addressed to each location in said memory and to enter digital data in the respective locations which data corresponds to the intensities of the pixels composing an image frame in the memory, using a direct memory access (DMA) controller to transfer the data for a frame presently in the memory to an input of an arithmetic logic unit (ALU) which unit has an output coupled to the input of a display controller memory which contains the digital data for a preceding frame and which has an output coupled to another input of the ALU, controlling the ALU to do one of passing the digital data for the present frame directly to the display controller or adding or subtracting the data for the present frame to or from the digital data for a previous frame in the display controller memory and return the resulting data to the display controller memory and return the resulting data to the display controller memory, transmitting said data, as a sequence of addresses corresponding to the brightness of the pixels comprising the image frame, from said display controller to a look-up table (LUT) that has been loaded previously with a translation table for converting the brightness levels represented by said addresses to brightness levels that result in using the full dynamic range of the television monitor with which the image formed by the pixels is to be displayed, and transmitting the resulting converted data from said LUT to a digital-to-analog converter for being converted to analog video signals for controlling the television monitor to display the images.

* * * * *